United States Patent [19]

Fenn et al.

[11] Patent Number: 5,541,268
[45] Date of Patent: Jul. 30, 1996

[54] COATING COMPOSITION

[75] Inventors: David R. Fenn, Burnham; Stephen P. Davies, High Wycombe, both of England

[73] Assignee: Imperial Chemical Industries PLC, London, England

[21] Appl. No.: 413,622

[22] Filed: Mar. 30, 1995

[30] Foreign Application Priority Data

Apr. 6, 1994 [GB] United Kingdom ........... 9406814
Sep. 2, 1994 [GB] United Kingdom ........... 9417758

[51] Int. Cl.⁶ ............................................. C08F 20/00
[52] U.S. Cl. ..................... 525/440; 528/65; 528/75; 528/80; 528/83; 528/272; 528/307; 525/437; 525/445; 524/81
[58] Field of Search ............................... 528/272, 307, 528/65, 75, 80, 83; 525/437, 440, 445; 524/81

[56] References Cited

U.S. PATENT DOCUMENTS 5,286,782  2/1994  Lamb et al. ............... 524/507
5,354,797  10/1994 Anderson et al. ........... 524/285

*Primary Examiner*—Samuel A. Acquah
*Attorney, Agent, or Firm*—Thomas M. Schmitz

[57] ABSTRACT

A coating composition having a good balance between solids content at a given viscosity and hardness in the final coating comprising a solution in a volatile organic solvent of;

i) a hydroxyl functional polymer
ii) a crosslinker for the polymer, characterised in that the composition also comprises iii) 1,4-cyclohexane dimethanol.

11 Claims, No Drawings

COATING COMPOSITION

This invention relates to coating compositions, comprising a hydroxyl functional polymer and a crosslinker in an organic solvent, which also comprise 1,4-cyclohexane dimethanol as a viscosity modifier. It also relates to a process for producing the compositions, to a process of coating using the compositions and to a coated substrate obtainable by the coating process.

Coatings used for the original painting of motor vehicles and for their repair are required to have very good physical properties such as hardness and resistance to water and solvents. The coating compositions are also required to have good application and appearance properties so that they are easy to apply to a substrate using spray application and result in final films having good gloss.

One class of coating compositions commonly used for these applications comprises a hydroxyl functional polymer and a crosslinker in an organic solvent. The hydroxyl functional polymer can be for example an acrylic addition polymer or a polyester polymer having hydroxyl groups. The crosslinker can be for example a polyisocyanate or a melamine formaldehyde resin. The compositions are applied as a layer to the surface of a substrate and either left to dry and cure at room temperature or else heated to initiate or speed the drying and curing process. During drying and curing the solvent evaporates and the polymer and crosslinker react together so as to produce a crosslinked coating film. These types of crosslinking coatings are sometimes referred to as "thermosetting" compositions.

Due to environmental considerations there is a general trend in the coatings industry towards coating compositions with reduced organic solvent content. Coatings with a lower organic solvent content emit lower levels of solvent when they are used and so are less polluting of the atmosphere.

One way to achieve a lower solvent content is to use so-called High-Solids compositions. High-solids compositions are solventborne compositions which contain a relatively high level of non-volatile materials such as film-forming polymer, pigments and fillers, and a relatively low level of organic solvent.

A problem with formulating high solids coating compositions suitable for use in painting motor vehicles is that the compositions can have an unacceptably high viscosity. This is because the film forming polymers traditionally used in this field have a high solution viscosity in high solids solutions. The high viscosity gives rise to problems in spray application with poor paint atomization, and poor flow out and consequent low gloss levels and poor appearance. In practice, these types of composition are formulated so as to have a predetermined viscosity to enable consistent spraying and this puts a limit on the solids content.

One way around the viscosity problem is to use lower molecular weight film-forming polymers. Generally, the lower the molecular weight of a solution polymer, the lower is its solution viscosity. However, the use of lower molecular weight polymers gives rise to further problems. The resulting final coating films are soft and mark easily, particularly in the first week or so after application. The dust free and print free times of the films (i.e. the length of time after application when dust no longer adheres to the surface and when finger prints no longer remain in the surface when it is pressed) are also unacceptably long. Soft and easily marked coatings are clearly unacceptable for high performance motor vehicle topcoats.

Another solution to the viscosity problem is to use an additive. Various additives are known which reduce the viscosity of polymer solutions, and these are known as viscosity modifiers. Viscosity modifiers come in a variety of forms but generally comprise a low molecular weight polymer, such as a polyester. There are a number of commercial viscosity modifiers available, such as Caspol G (trade mark of Caschem) and K-Flex (trade mark of King Industries). We believe that K-Flex is a polyester incorporating units derived from cyclohexane dimethanol. There is also a reference in U.S. Pat. No. 5,286,782 to the use of an adduct of cyclohexane dimethanol and caprolactone as a viscosity modifier.

A disadvantage of these known viscosity modifiers is that while they may reduce the viscosity of a polymer solution, when they are used in coating compositions, they make the final films unacceptably soft in much the same way as the use of low molecular weight polymers.

There is a need therefore for high-solids coating compositions which have an acceptable application viscosity and which produce hard films.

According to the present invention there is provided a coating composition comprising a solution in a volatile organic solvent of;

i) a hydroxyl functional polymer ii) a crosslinker for the polymer, characterised in that the composition also comprises iii) 1,4-cyclohexane dimethanol.

Preferably the compositions contain less than 500 g/l of volatile organic solvent based on the total composition, more preferably less than 480 g/l and most preferably less than 420 g/l.

The volatile organic solvent can be any solvent which will dissolve the hydroxyl functional polymer, the crosslinker and the 1,4-cyclohexane dimethanol. It can be an aliphatic or aromatic hydrocarbon such as Solvesso 100 (trademark), toluene or xylene, an alcohol such as butanol or isopropanol, an ester such as butyl acetate or ethyl acetate, a ketone such as acetone, methyl isobutyl ketone, methyl isoamyl ketone or methyl ethyl ketone, an ether, an ether-alcohol or an ether-ester or a mixture of any of these.

The hydroxyl functional polymer can be any conventional hydroxyl functional film-forming polymer known in the coatings art. Conventional film forming polymers include acrylic addition polymers, epoxy polymers, alkyd polymers, polyether polymers or polyester polymers. Preferred hydroxyl functional polymers are polyesters and acrylic addition polymers, most preferred are acrylic addition polymers.

Hydroxyl functional acrylic addition polymers are derived from polymerisable ethylenically unsaturated monomers such as vinyl or acrylic monomers and comprise functional units and structural units. Whenever referred to herein, the term acrylic monomer refers to esters of acrylic or methacrylic acid. The term (meth) acrylate refers to both the acrylate and methacrylate equally and the term (meth) acrylic acid refers to acrylic or methacrylic acid equally.

Functional units are derived from hydroxyl functional vinyl or acrylic monomers. An example of a hydroxyl functional vinyl monomer is vinyl alcohol. Examples of hydroxyl functional acrylic monomers are hydroxy ethyl (meth) acrylate, hydroxy butyl (meth) acrylate and hydroxy propyl (meth) acrylate.

Other examples of suitable hydroxyl functional monomers are the reaction products of glycidyl (meth) acrylate with monocarboxylic acids, such as versatic acid and the reaction product of (meth) acrylic acid with monoepoxy compounds such as Cardura E (the glycidyl ester of versatic acid; trade mark of Shell).

Structural units are derived from monomers which do not have any functional groups which will react with the crosslinker. Examples of monomers which do not do not have any functional group which will react with the crosslinker are non-functional vinyl monomers and alkyl esters of (meth) acrylic acid.

Examples of suitable non-functional vinyl monomers are styrene and tertiary butyl styrene, preferably tertiary butyl styrene. Examples of suitable alkyl esters of (meth) acrylic acid are $C_{1-12}$ alkyl esters such as methyl (meth) acrylate, ethyl (meth) acrylate, n-butyl (meth) acrylate, t-butyl (meth) acrylate, n-propyl (meth) acrylate and isobornyl (meth)acrylate.

It is also possible to include certain monomers which carry groups other than hydroxyl groups, such as carboxylic acid groups, amine groups and epoxy groups. An example of a monomer carrying a carboxylic acid group is (meth) acrylic acid. An example of a monomer carrying an amine groups is tertiarybutyl aminoethyl (meth) acrylate. An example of a monomer carrying a glycidyl group is glycidyl (meth) acrylate.

It is also possible to react certain functional groups with other compound so as to modify the polymer. For example, acid groups on the polymer can be reacted with glycidyl functional compounds such as the glycidyl ester of versatic acid (Cardura E from Shell) and epoxy groups on the polymer can be reacted with an acid functional compound, for example versatic acid.

Preferred acrylic addition polymers have a number average molecular weight as measured by gel permeation chromatography of 700 to 10 000, more preferably 1 000 to 4 000.

Preferred acrylic addition polymers have a theoretical glass transition temperature (Fox Tg) of 0° to 80° C., more preferably 20° to 70° C.

Preferably the hydroxyl functional polymer has a hydroxyl value of 5 to 500, more preferably 50 to 250.

The crosslinker is a compound which will react with at least two hydroxyl groups. Examples of suitable crosslinkers are melamine formaldehydes resins and polyisocyanates. Polyisocyanates are preferred.

Melamine formaldehyde resins are well known in the coating art. They are the product of the reaction of melamine and formaldehyde. Examples of commercially available melamine formaldehydes are partially and fully alkylated melamines such as partially methylated melamines and hexamethoxy methyl melamine.

Polyisocyanates are also well known in the coatings art. Poly isocyanates are compounds having two or more isocyanate groups per molecule. The isocyanate groups can be blocked but unblocked isocyanates are preferred.

Suitable diisocyanates are aliphatic or aromatic diisocyanates. Examples of suitable aliphatic diisocyanates are hexamethylene diisocyanate and isophorone diisocyanate. Examples of suitable aromatic diisocyanates are toluene diisocyanate and 4,4'-diphenylmethane diisocyanate.

Other suitable polyisocyanates include the isocyanurate trimers, allophanates and uretdiones of diisocyanates such as those described above as well as the reaction products of these diisocyanates with polyols. Polyols are compounds having three or more hydroxyl groups. Suitable polyols include trimethylol propane, glycerol and pentaerithritol. Many such poly isocyanates are commercially available, for example under the Desmodur trade mark from Bayer or the Tolonate trade mark from Rhone Poulenc.

Polyisocyanate crosslinkers are preferably used in an amount such that the ratio of isocyanate groups on the polyisocyanate to the total number of hydroxyl groups in the composition is in the range 0.8 to 1.4, more preferably 0.9 to 1.1.

The 1,4-cyclohexane dimethanol acts as a viscosity modifier for the compositions. The use of 1,4-cyclohexane dimethanol in this way allows the production of compositions having a good combination of relatively high solids at a given viscosity level in the liquid compositions together with good hardness in the final films.

1,4-cyclohexane dimethanol is a commercially available material usually supplied as a mixture of cis and trans forms. Preferably the compositions comprise 1 to 20% by weight of 1,4-cyclohexane dimethanol based on the weight of the hydroxyl functional polymer, preferably 2 to 15 % by weight more preferably 4% to 15%, most preferably 6% to 15%.

The compositions preferably also comprise a polyester having units derived from 1,4-cyclohexane dimethanol. It has been found that the presence of such a polyester improves the compatibility and storage stability of the compositions, particularly when higher levels of 1,4-cyclohexane dimethanol are used. Conveniently, a preformed mixture of 1,4-cyclohexane dimethanol and polyester is used. Such a mixture is itself novel.

The polyester has units derived from 1,4-cyclohexane dimethanol, units derived from a polybasic acid and optionally units derived from a polyhydroxy compound.

Polybasic acids are compounds having two or more carboxylic acid groups or an equivalent number of anhydride groups (on the basis that one anhydride group is equivalent to two acid groups). Such polybasic acids are well known in the polyester art. Examples of suitable polybasic acids are $C_{1-6}$ alkane dioic acids such as adipic acid or hexanedioic acid, cycloaliphatic acids such as hexahydrophthalic acid, unsaturated alkane dioic acids such as fumaric or maleic acids, dimer acids, and aromatic acids such as phthalic acid. Their equivalent anhydrides such as maleic anhydride or phthalic anhydride can also be used. Preferably the polybasic acids are saturated.

Polyhydroxy compounds are compounds having two or more hydroxyl groups and are well known in the polyester art. Examples of suitable polyhydroxy compounds are trimethylol propane, glycerol, neopentyl glycol and pentaerithritol.

Preferably the polyester comprises at least 20% by weight of units derived from 1,4-cyclohexane dimethanol, more preferably at least 30% by weight and most preferably at least 40% by weight.

Preferably the polyester has a hydroxyl value of 50 to 300 mg KOH/g of nonvolatile resin, more preferably 110 to 170 mgKOH/g. Preferably the polyester has a number average molecular weight of 600 to 4000, more preferably 600 to 2000.

Preferably the weight ratio of the free 1,4-cyclohexane dimethanol to the polyester in the compositions is 10:1 to 1:30, more preferably 1:1 to 1:10.

The compositions can also contain catalysts for the isocyanate-hydroxyl reaction. Suitable catalysts include tin catalysts such as dibutyl tin dilaurate and amine catalysts such as triethylamine.

The compositions can also contain other conventional paint additives such as pigments, fillers, UV absorbers and flow aids. Preferably the compositions are formulated to be suitable for use in the refinishing of motor vehicles.

The compositions can be made by dissolving the components in the organic solvent in any order. Generally, when the crosslinker is an unblocked polyisocyanate then the composition is preferably made by adding the polyisocyanate to the other components shortly before use. This avoids problems with the potlife of these compositions.

Many suitable hydroxyl functional polymers are commercially available. They can also be produced by conventional means. When the hydroxyl functional polymer is an acrylic addition polymer it can be produced by contacting a mixture of the appropriate monomers with a polymerisation initiator at a temperature at which polymerisation occurs. For example the monomer mixture can be slowly fed into a solution of initiator held at the polymerisation temperature or the initiator can be fed into a solvent at the polymerisation temperature simultaneously with the monomer mixture.

Suitable initiators are azo initiators such as 2,2' azobis (2-methylbutyronitrile) or peroxy initiators such as benzoyl peroxide.

The polyester having units derived from 1,4-cyclohexane dimethanol can be made by conventional means. Generally the components of the polyester are melted together or dissolved in a suitable solvent. The melt or solution is then heated so as to remove the water produced in the reaction between the acid and the hydroxyl groups. When the components are dissolved in a solvent the water can conveniently be removed by azeotropic distillation using a Dean and Stark apparatus.

A convenient and preferred method of producing a mixture of a polyester derived from 1,4-cyclohexane dimethanol and 1,4-cyclohexane dimethanol itself is to use an appropriate excess of 1,4-cyclohexane dimethanol when making the polyester.

The coating composition of the invention can be applied to the surface of a substrate and then allowed or caused to dry and cure. According to the present invention there is provided a process for coating a substrate which comprises the steps of applying a layer of a coating composition according to the present invention to a surface of the substrate and thereafter causing or allowing the layer to cure.

The coating composition can be applied by conventional means such as by brush, roller or spray, preferably spray.

The substrate can be for example, metal, plastic, wood or glass. The compositions are particularly useful for refinishing motor vehicles.

The applied layer can be allowed to cure at ambient temperature in the case where the hydroxyl polymer and crosslinker react together at ambient temperatures. This is generally the case for example when the crosslinker is a polyisocyanate.

Alternatively the layer can be baked at elevated temperatures, for example 50°–120° C., either to accelerate curing or to cause curing when the crosslinker will only react with the hydroxyl functional polymer at elevated temperatures. This is generally the case when the crosslinker is a blocked polyisocyanate or a melamine formaldehyde.

According to the present invention there is also provided a coated article obtainable by the process.

The invention will now be illustrated by means of the following examples.

EXAMPLES

1. Preparation of mixtures of 1,4-cyclohexane dimethanol and a polyester based on 1,4-cyclohexane dimethanol.

A convenient method of producing a mixture of 1,4-cyclohexane dimethanol and a polyester containing 1,4-cyclohexane dimethanol is to use an excess of 1,4-cyclohexane dimethanol in making the polyester. The following preparations illustrate the preparations of various polyesters in which as excess of 1,4-cyclohexane dimethanol is used.

1.1 Polyester Mixture 1

In the preparation of polyester mixture 1, a 2 moles excess of 1,4-cyclohexane dimethanol was used over that required to fully react with the other carboxyl components per mole of polyester.

Trimethylol propane (213 g), 1,4-cyclohexane dimethanol (1144.9 g), hexahydrophthalic anhydride (682.3 g), adipic acid (52.3 g) and methylisobutyl ketone (40 g) were heated to 90° C. under nitrogen with stirring in an apparatus equipped with a Dean and Stark separator for removing the water produced in the reaction. The temperature rose spontaneously to 137° C. over about 30 minutes. The temperature was raised to 215° C. for 1 hour and the mixture was allowed to cool to room temperature and left over night. The mixture was heated to 215° C. for 7 hours and then allowed to cool to room temperature and left over night. The mixture was heated to 215° C. for 2 hours and allowed to cool to room temperature. The final acid value was 6.8 mgKOH/g of non-volatile resin. The final hydroxyl value was 5.668 mgKOH/g of non-volatile resin.

1.2 Polyester

In the preparation of polyester mixture 2, a 1 mole excess of 1,4-cyclohexane dimethanol was used over that required to fully react with the other carboxyl components per mole of polyester.

Trimethylol propane (240.5 g), 1,4-cyclohexane dimethanol (1033.9 g), hexahydrophthalic anhydride (776.7 g), adipic acid (52.6 g) and methylisobutyl ketone (40 g) were heated to 90° C. under nitrogen with stirring in an apparatus equipped with a Dean and Stark separator for removing the water produced in the reaction. The temperature rose spontaneously to 141° C. over about 30 minutes. The temperature was slowly raised to 215° C. over 2 hours and the mixture was stirred at about 214° C. for 3 hours after which it was allowed to cool to room temperature and left over night. The mixture was heated to 214° C. for 4 hours and then allowed to cool to room temperature. The final acid value was 8.0 mgKOH/g of non-volatile resin. The final hydroxyl value was 4.611 mgKOH/g of non-volatile resin.

1.3 Polyester Mixture 3

In the preparation of polyester mixture 3, a 4 moles excess of 1,4-cyclohexane dimethanol was used over that required to fully react with the other carboxyl components per mole of polyester.

Trimethylol propane (650.6 g), 1,4-cyclohexane dimethanol (4893.5 g), hexahydrophthalic anhydride (2048.5 g), adipic acid (194.9 g) and methylisobutyl ketone (150 g) were heated to 60° C. under nitrogen with stirring in an apparatus equipped with a Dean and Stark separator for removing the water produced in the reaction. The temperature rose spontaneously to 86° C. over about 20 minutes. The temperature was slowly raised to 170° C. over 2 hours and then to 215° C. over a further 2.5 hours. The mixture was stirred at about 215° C. for 1 hour after which in was allowed to cool to room temperature and left over night. The mixture was heated to 215° C. for 5.5 hours and then allowed to cool to room temperature. The final acid value was 7.4 mgKOH/g of non-volatile resin. The final hydroxyl value was 7.23 mgKOH/g of non-volatile resin.

2. Comparative Polyester Mixture A

In order to compare the effect of 1,4-cyclohexane dimethanol with that of another common polyol, a comparative composition was prepared comprising a polyester containing neopentyl glycol and a two mole excess of neopentyl glycol per mole of polyester. Neopentyl glycol was chosen as a commonly used diol.

Trimethylol propane (443.6 g), neopentyl glycol (1722.8.5 g), hexahydrophthalic anhydride (1421.4 g), and adipic acid (103.5 g) were heated to 60° C. under nitrogen with stirring in an apparatus equipped with a Dean and Stark separator for removing the water produced in the reaction. The temperature rose spontaneously to 126° C. over about 15 minutes. The temperature was slowly raised to 180° C. over 1.5 hours and then to 215° C. over a further 2.5 hours. The mixture was stirred at about 215° C. for 1 hour after which it was allowed to cool to room temperature and left over night. The mixture was heated to 215° C. for 6.75 hours and then allowed to cool to room temperature and left over night. Methyl isobutyl ketone (70 g) was added and the mixture was heated to 215° C. for 4.5 hours and then allowed to cool to room temperature. Butyl acetate (700 g) was added. The final hydroxyl value was 6.74 mgKOH/g of non-volatile resin.

3. Comparative polyester B

The polyester derived from cyclohexane dimethanol and epsilon caprolactone as described in U.S. Pat. No. 5,286,782 was prepared as described in column 7 lines 32 to 54 of the patent as follows;

1,4-cyclohexane dimethanol (739.8 g), epsilon caprolactone (1756.85 g) and dibutyl tin dilaurate (3.35 g of a 10% by weight solution in xylene) were stirred at 140° C. for 4 hours and allowed to cool.

3. Preparation of hydroxyl Functional acrylic Addition Polymer 1

Methyl isoamyl ketone (613 g) was heated to reflux temperature (about 145° C.) with stirring under nitrogen. A mixture of methyl methacrylate (618.4 g), butyl acrylate (434.8 g), hydroxy ethyl methacrylate (507 g), styrene (390 g), Vazo 67 (2,2-azobis-(2-methylbutyronitrile), trade mark of dupont 97.5 g), primary octyl mercaptan (97.5 g) and methyl isoamyl ketone (235 g) were added slowly to the refluxing mixture over a period of 3 hours. Trigonox 21s (butyl peroxy-2-ethyl hexanoate, trade mark of Akzo, 3.4 g) was added and the mixture was stirred at reflux temperature for a further hour. Trigonox 21s (3.4 g) was added, the mixture was stirred at reflux temperature for a further hour and the mixture was allowed to cool to room temperature. The resulting hydroxyl functional acrylic addition polymer had a calculated glass transition temperature (Fox Tg) of 40° C., a hydroxyl value of 112 mgKOH/g based on non-volatile content and had a non-volatile content of 70%.

4. Preparation of coating compositions.

The following coating compositions were produced. They all contain hydroxyl functional acrylic addition polymer 1 produced in 3.1 above, a polyisocyanate HDT 90 (trademark) and dibutyl tin dilaurate catalyst (DBTDL; a 0.5% by weight solution in butyl acetate). Compositions 2 to 10 also contain either 1,4-cyclohexane dimethanol (CHDM) or an alternative viscosity modifier. Each composition was initially made so as to have a non-volatile content of 60%. The ratio of NCO groups to the total hydroxyl groups in the compositions was 1:1.

4.1 Composition 1

| | Weight (g) |
|---|---|
| Polymer 1 | 93.98 |
| HDT 90 | 28.05 |
| DBTDL (0.5% soln.) | 0.90 |
| Butyl Acetate | 27.07 |

4.2 Composition 2

| | Weight (g) |
|---|---|
| Polymer 1 | 79.66 |
| HDT 90 | 35.81 |
| DBTDL (0.5% soln.) | 0.90 |
| Butyl Acetate | 30.74 |
| Neopentyl Glycol | 2.89 |

4.3 Composition 3

| | Weight (g) |
|---|---|
| Polymer 1 | 84.65 |
| HDT 90 | 31.78 |
| DBTDL (0.5% soln.) | 0.90 |
| Butyl Acetate | 29.6 |
| Ester Diol 204* | 3.07 |

*Commercial viscosity modifier 4.4 Composition 4

| | Weight (g) |
|---|---|
| Polymer 1 | 83.22 |
| HDT 90 | 31.12 |
| DBTDL (0.5% soln.) | 0.90 |
| Butyl Acetate | 30.11 |
| K-Flex UD 320-100** | 4.65 |

**Trade mark of King Ind.; commercial viscosity modifier 4.5 Composition 5

| | Weight (g) |
|---|---|
| Polymer 1 | 83.90 |
| HDT 90 | 30.56 |
| DBTDL (0.5% soln.) | 0.90 |
| Butyl Acetate | 29.95 |
| Caspol G*** | 4.69 |

***Trade mark of Caschem.; Commercial viscosity modifier 4.6 Composition 6

| | Weight (g) |
|---|---|
| Polymer 1 | 82.40 |
| HDT 90 | 33.59 |
| DBTDL (0.5% soln.) | 0.90 |
| Butyl Acetate | 30.12 |
| CHDM | 2.99 |

4.7 Composition 7

| | Weight (g) |
|---|---|
| Polymer 1 | 53.92 |
| HDT 90 | 41.03 |
| DBTDL (0.5% soln.) | 0.90 |
| Butyl Acetate | 34.22 |
| Polyester Mixture 3 | 19.93 |

4.8 Composition 8

| | Weight (g) |
|---|---|
| Polymer 1 | 57.00 |
| HDT 90 | 37.67 |
| DBTDL (0.5% soln.) | 0.90 |

-continued

| | Weight (g) |
|---|---|
| Butyl Acetate | 34.56 |
| Polyester Mixture 1 | 19.87 |

4.9 Composition 9

| | Weight (g) |
|---|---|
| Polymer 1 | 59.28 |
| HDT 90 | 35.17 |
| DBTDL (0.5% soln.) | 0.90 |
| Butyl Acetate | 32.72 |
| Polyester Mixture 2 | 21.93 |

4.10 Composition 10

| | Weight (g) |
|---|---|
| Polymer 1 | 54.82 |
| HDT 90 | 40.04 |
| DBTDL (0.5% soln.) | 0.90 |
| Butyl Acetate | 34.00 |
| Polyester Mixture A | 20.24 |

4.11 Composition 11

| | Weight (g) |
|---|---|
| Polymer 1 | 54.82 |
| HDT 90 | 40.04 |
| DBTDL (0.5% soln.) | 0.90 |
| Butyl Acetate | 34.00 |
| Polyester B | 20.24 |

5. Application and Testing.

The above compositions were each thinned with enough butyl acetate to result in a composition having an initial viscosity of 25 seconds as measured by BS B4 cup at 25° C. The non-volatile content of each composition was measured by heating an accurately weighed sample of about 0.3 g of the composition to 110° C. for 1 hour then reweighing and calculating the non-volatile content based on the weight loss. The non-volatile content of each composition is given below in Table 1.

The thinned compositions were applied to clean glass panels using a 175 μm block spreader. A glass panel was coated with each composition. The panel coated with each composition was left to dry at ambient temperature (20° C.) for 24 hours. The hardness of the coatings was then determined using an Erichsen Hardness tester (Trademark).

The hardness results (expressed as Konig Hardness in seconds) and the solids of the compositions are given below in Table 1.

TABLE 1

| Composition | Non-volatile content | Air Dry Hardness |
|---|---|---|
| 1 | 55.8 | 9 |
| 2 | 56.8 | 7 |
| 3 | 56.8 | 4 |
| 4 | 56.5 | 7 |
| 5 | 57.4 | 7 |
| 6 | 57.7 | 10 |
| 7 | 59.8 | 25 |
| 8 | 59.9 | 20 |
| 9 | 58.4 | 15 |

TABLE 1-continued

| Composition | Non-volatile content | Air Dry Hardness |
|---|---|---|
| 10 | 59.1 | 6 |
| 11 | 59.1 | 6 |

The results show that none of the other similar known diluents (Compositions 1 to 5 and 11) achieved the same combination of high solids at a given viscosity, and good hardness as that achieved by the use of CHDM (Compositions 6 to 9).

6. Hydroxyl Functional Acrylic Addition Polymers 2 to 7.

Hydroxyl functional addition polymers 2 to 7 suitable for use in compositions according to the invention were made according to the following general method. The amounts of the components are given in Table 2 below.

Solvent 1 was heated to reflux temperature (about 145° C.) with stirring under nitrogen. A mixture of the monomers, initiator 1, chain transfer agent and solvent 2 was added slowly over a period of 3 hours at reflux temperature. Initiator 2 was added and the mixture was stirred at reflux temperature for a further hour. A further identical quantity of Initiator 2 was added, the mixture was stirred at reflux temperature for a further hour and the mixture was allowed to cool to room temperature.

TABLE 2

| | | Polymer | | |
|---|---|---|---|---|
| | | 2 | 3 | 4 |
| Solvent 1 | Methyl isoamyl ketone (MIAK) | 303.5 | 313.0 | 313.9 |
| Monomers | Isobornyl methacrylate | 364.25 | 408.3 | 377.2 |
| | Butyl Acrylate | 109.03 | 101.6 | 139.2 |
| | Hydroxybutyl Acrylate | 254.6 | 286.8 | 290.5 |
| | Acrylic Acid | 0.301 | 0.0 | 0.0 |
| | Cardura E10 | 80.13 | 0.0 | 0.0 |
| | alphamethyl styrene | 202.69 | 0.0 | 201.7 |
| | Styrene | 0.0 | 199.2 | 0.0 |
| Initiator 1 | Vazo 67 | 45.47 | 44.8 | 45.4 |
| Chain transfer agent | Mercapto propionic acid (MPA) | 22.0 | 0.0 | 0.0 |
| | primary octyl mercaptan (pom) | 0.0 | 34.9 | 10.1 |
| Solvent 2 | MIAK | 114.6 | 108.1 | 118.5 |
| | Butyl Acetate | 0.0 | 0.0 | 0.0 |
| Initiator 2 | Trigonox 21s (each addition) | 1.71 | 1.7 | 1.8 |

| | | Polymer | | |
|---|---|---|---|---|
| | | 5 | 6 | 7 |
| Solvent 1 | Butyl Acetate | 316.1 | 320.0 | 314.3 |
| | Solvesso 100 | 316.1 | 320.0 | 314.3 |
| Monomers | IBoMA | 432.2 | 563.2 | 559.0 |
| | HBA | 362.1 | 509.8 | 506.1 |
| | Acrylic Acid | 199.0 | 36.2 | 0.0 |
| | Methacrylic Acid | 0.0 | 0.0 | 7.2 |
| | Cardura E10 | 616.1 | 125.0 | 124.0 |
| | Styrene | 402.3 | 0.0 | 400.0 |
| | Methyl methacrylate | 0.0 | 392.8 | 0.0 |
| | tertiarybutyl acrylate | 0.0 | 388.0 | 403.9 |
| Initiator 1 | Vazo 67 | 106.0 | 90.0 | 100.0 |
| Chain transfer agent | MPA | 0.0 | 0.0 | 44.2 |
| | pom | 21.7 | 70.0 | 0.0 |
| Solvent 2 | Butyl Acetate | 221.3 | 224.7 | 220.0 |

TABLE 2-continued

| | | | | |
|---|---|---|---|---|
| Initiator 2 | Trigonox 21s (each addition) | 3.5 | 0.0 | 3.5 |

Solvesso 100 is an aliphatic hydrocarbon solvent from Exxon Chemicals
Cardura E10 is the glycidyl ester of versatic acid.

7. Hydroxyl Functional acrylic Addition Polymer 8

Methyl isoamyl ketone (313 g) was heated to reflux temperature (about 145° C.) with stirring under nitrogen. A mixture of methyl methacrylate (226.9 ), butyl acrylate (243.0 g), hydroxy propyl methacrylate (286.8 g), styrene (199.2 g), Vazo 67 (2,2-azobis-( 2-methylbutyronitrile), trade mark of dupont 44.8 g), primary octyl mercaptan (34.8 g) and methyl isoamyl ketone (108.1 g) were added slowly to the refluxing mixture over a period of 3 hours. Trigonox 21s (butyl peroxy-2-ethyl hexanoate, trade mark of Akzo, 1.7 g) was added and the mixture was stirred at reflux temperature for a further hour. Trigonox 21s (1.7 g) was added, the mixture was stirred at reflux temperature for a further hour and the mixture was allowed to cool to room temperature. The resulting hydroxyl functional acrylic addition polymer had a calculated glass transition temperature (Fox Tg) of 40° C., a hydroxyl value of 112 mgKOH/g based on non-volatile content and had a non-volatile content of 71.9 weight %.

8. Compositions 12 to 14

Compositions 12 to 14 were made to compare Polyester Mixture 3 and Comparative Polyester B as diluents. The three compositions comprise Acrylic Polymer 8, dibutyl tin dilaurate catalyst (DBTDL 2% by weight solution in butyl acetate), butyl acetate and a polyisocyanate Tolonate HDT 90. Composition 13 also comprised Polyester Mixture 3 and Composition 14 also comprised Comparative Polyester B. The components are given in Table 3 below.

TABLE 3

| | Composition | | |
|---|---|---|---|
| | 12 | 13 | 14 |
| Addition Polymer 8 | 95.08 | 54.73 | 62.32 |
| Polyester Mixture 3 | 00.00 | 22.95 | 00.00 |
| Comparative Polyester B | 00.00 | 00.00 | 26.14 |
| DBTDL (2% soln.) | 0.22 | 0.22 | 0.22 |
| Butyl Acetate | 27.06 | 31.58 | 29.08 |
| Tolonate HDT 90 | 27.63 | 40.49 | 32.23 |

9. Testing of Compositions 12 to 14

These compositions were diluted with small quantities of butyl acetate to a viscosity of 25 seconds BS B4 cup at 25° C. The non-volatile content of each composition was measured by the method given in 5 above. The thinned compositions were applied to clean glass panels using a 175μm block spreader. The panel coated with each composition was allowed to dry at ambient temperature (20° C.) for 48 hours. The Konig hardness of the coatings was determined using an Erichsen Hardness Tester (trade mark). The Konig hardness (seconds) and the solids content (weight %) and volatile organic content (voc in g/l) of the composition are given in Table 4 below;

TABLE 4

| Composition | Hardness | voc | solids |
|---|---|---|---|
| 12 | 15 | 441.3 | 55.49 |
| 13 | 70 | 409.1 | 59.52 |
| 14 | 16 | 388.5 | 61.37 |

Composition 14 became unusable after 1 hour while compositions 12 and 13 remained usable for at least 4 hours.

We claim:

1. A coating composition in a volatile organic solvent, the coating comprising:

a hydroxyl functional polymer;

between 1% and 20% by weight of free unreacted 1,4-cyclohexane dimenthanol based on the weight of the hydroxyl functional polymer;

a hydroxyl functional polyester of at least 20% by weight 1,4-cyclohexane dimenthanol esterified with polybasic acid having two or more carboxylic acid group to produce a polyester having an hydroxyl value from 50 to 300 mgm. KOH/gm. and a number average molecular weight between 600 and 4000; and a crosslinker adapted to crosslink with the hydroxyl polymer, the 1,4-cyclohexane dimethanol, and the hydroxyl functional polyester, where the crosslinker has corrective crosslinking groups at a ratio of 0.8 to 1.4 per corrective functional hydroxyl groups on said polymer, dimethanol and polyester.

2. A composition according to claim 1 which contains less than 500 g/l of volatile organic solvent.

3. A composition according to claim 1 in which the hydroxyl functional polymer is a hydroxyl functional acrylic addition polymer.

4. A composition according to claim 1 in which the crosslinker is a polyisocyanate.

5. A composition according to claim 1 in which the polyester comprises at least 20% by weight of units derived from 1,4-cyclohexane dimethanol.

6. A composition according to claim 1 in which the weight ratio of 1,4-cyclohexane dimethanol to polyester is 10:1 to 1:30.

7. A process for making a composition according to claim 1 which comprises dissolving the components together in an organic solvent.

8. A process of coating which comprises applying a layer of a composition according to claim 1 to the surface of a substrate and causing or allowing the layer to cure.

9. A coated article obtained by the process of claim 1.

10. A mixture of 1,4-cyclohexane dimethanol and a polyester having units derived from 1,4-cyclohexane dimethanol.

11. A coating composition in a volatile organic solvent, the composition comprising:

a hydroxyl functional polymer;

between 1% and 20% by weight of free unreacted 1,4-cyclohexane dimenthanol based on the weight of the hydroxyl functional polymer; and a crosslinker adapted to crosslink with the hydroxyl functional polymer and the 1,4-cyclohexane dimethanol.

* * * * *